United States Patent
Mathisen

[11] 4,084,909
[45] Apr. 18, 1978

[54] DRUM MONOCHROMATOR

[75] Inventor: Einar Skau Mathisen, Poughkeepsie, N.Y.

[73] Assignee: International Business Machines Corporation, Armonk, N.Y.

[21] Appl. No.: 706,982

[22] Filed: Jul. 19, 1976

[51] Int. Cl.² .............................................. G01J 3/48
[52] U.S. Cl. ..................................... 356/188; 350/6.8; 350/315; 356/99; 358/200
[58] Field of Search ............... 356/188, 315, 186, 205, 356/217, 179, 193, 195, 99, 100; 350/96 B, 313, 315, 6, 7; 358/200, 205, 253

[56] References Cited
U.S. PATENT DOCUMENTS

| | | | |
|---|---|---|---|
| 3,416,864 | 12/1968 | Keahl et al. | 350/315 |
| 3,765,775 | 10/1973 | Ganssle et al. | 356/188 |
| 3,794,425 | 2/1976 | Smith et al. | 356/188 |
| 3,922,092 | 11/1975 | van den Bosch | 356/100 |
| 4,012,147 | 3/1977 | Walrafen | 356/100 |

Primary Examiner—John K. Corbin
Assistant Examiner—B. W. delos Reyes
Attorney, Agent, or Firm—James E. Murray

[57] ABSTRACT

This monochromator is made up of a number of discrete narrow band interference filters mounted on a drum which rotates with respect to a light beam so that as the light beam passes through each of the filter the angle of incidence of the light beam changes with respect to the filter. Each of the filters is for a different normal wavelength of peak transmission so that spectral analysis of the light source can be obtained.

6 Claims, 4 Drawing Figures

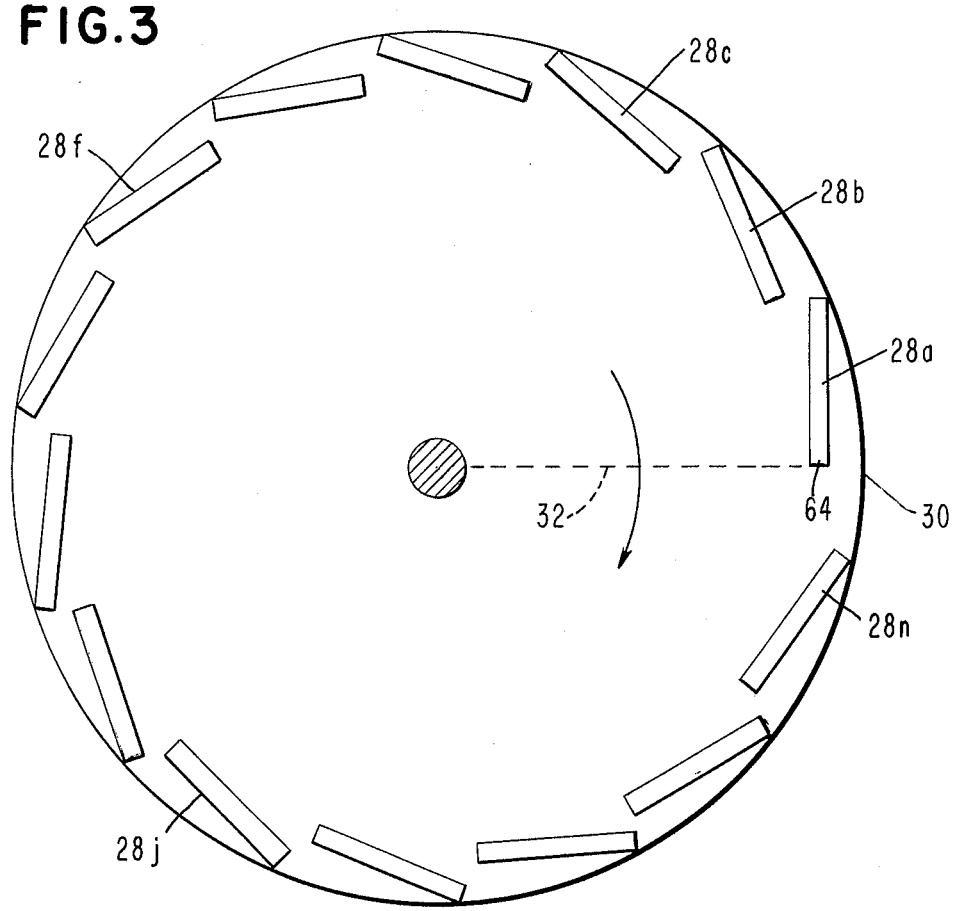
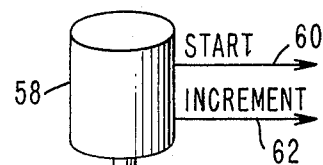
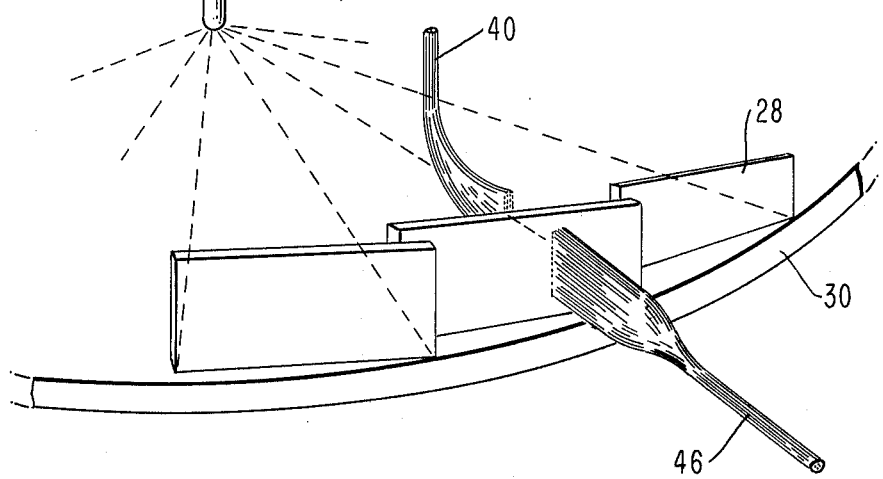

DRUM MONOCHROMATOR

BACKGROUND OF THE INVENTION

The present invention relates to devices for analyzing the spectrum of a light source.

Spectral analysis of a material can be performed using filters which break up light from the material into its component colors. The relative strength of the light at different wavelengths can then be plotted and analyzed to obtain the spectrum. One type of filter used for this purpose is a wedge shaped interference filter which varies the wavelength of the light transmitted through it as a function of where light hits the filter. Such filters cover the whole visible spectrum of approximately 400 to 700 nanometers from one end of the filter to the other. They are sometimes formed as an annular ring on a disk that can be rotated passed a narrow beam of light to select where the light enters the filter. Wedge shaped filters of this type are difficult to make with the necessary selectivity or resolution.

THE INVENTION

Therefore in accordance with the present invention a new monochromator is provided for spectral analysis. This monochromator makes use of the known characteristic of narrow band interference filters that as the angle of incidence of light hitting the filter changes the peak frequency of the filter changes. Thus a narrow band filter can be used to provide a band of operation and a plurality of these filters rotated in sequence passed the light source can be used to cover the whole visible spectrum of say 400–700 nanometers. To facilitate movement passed the light source, the filters are mounted on a drum and moved passed a light source in order of decreasing normal wavelength of peak transmission so that a continuous band width filtration is provided for the light source.

Therefore it is an object of the present invention to provide a wide band light filter capable of high selectivity.

THE DRAWINGS

The foregoing and other objects and features of the present invention will be apparent from the following description of the preferred embodiment of the invention as illustrated in the drawings of which:

FIGS. 3 and 4 show how the filter of FIG. 1 can be incorporated in accordance with the present invention to provide total coverage of the visible spectrum.

DETAILED DESCRIPTION

Figure 1:
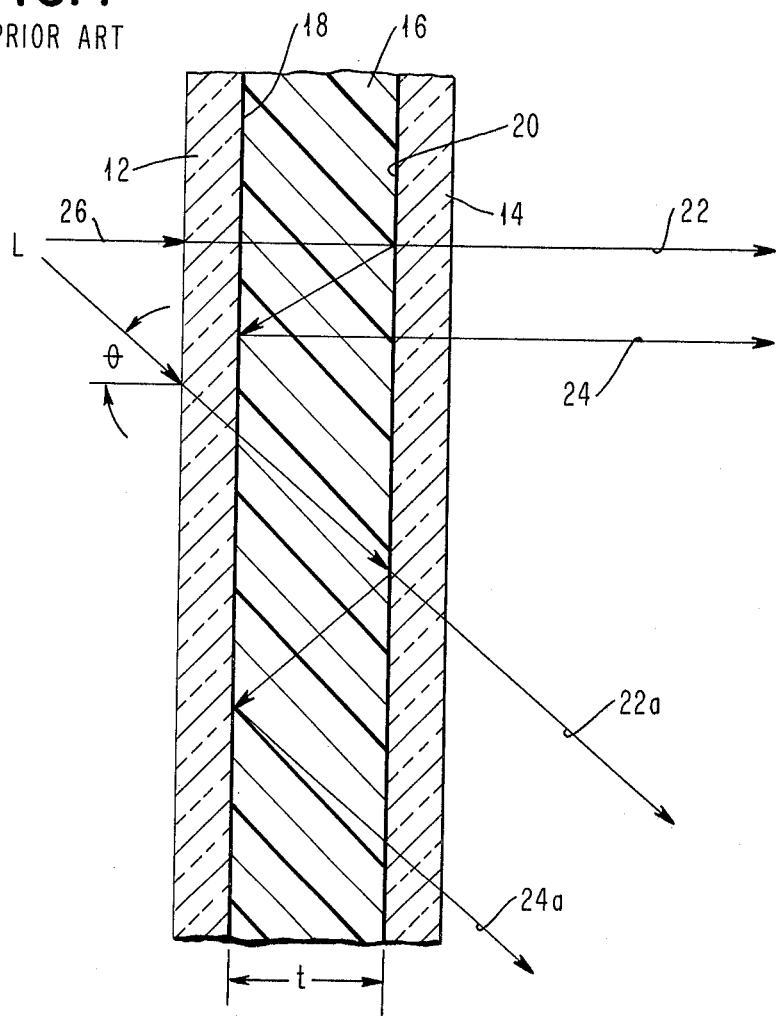
FIG. 1 is a diagram of a prior art interference filter.

Referring to FIG. 1, one prior art peak frequency interference filter comprises two plates of glass 12 and 14 with a dielectric material 16 of uniform thickness $t$ sandwiched between them. Deposited on the interior surface of the two glass plates are metal layers 18 and 20 of silver or aluminum that act as partially reflecting surfaces. Light passing through this filter does so in two paths one 22 that passes directly through the filter and the other 24 that passes through the filter after being reflected off the interior surface of the layers 18 and 20. One of the paths 22 is obviously longer than the other path 24. Where the light beam 26 is normal to the surface of the filter, the difference in the length of the paths 22 and 24 is twice the thickness $t$ of the dielectric 16. With the light beam normal to the surface, peak transmission through the filter occurs at a wavelength $n\lambda = 2t$ where the two emergent beams 22 and 24 reinforce each other. As the angle of incidence $\theta$ of the light beam with respect to normal increases the wavelength $\lambda$ of peak transmission is reduced. This is because the path difference through the dielectric decreases thus reducing the wavelength at which the two light beams 22 and 24 reinforce each other. Such filters and characteristics thereof are well known and can be found described beginning on page 20–71 of "Military Standardization Handbook, *Optical Design*", (MIL-HDBK-141) published Oct. 5, 1962 by the Defense Supply Agency, Washington 25, D.C.

Figure 2:
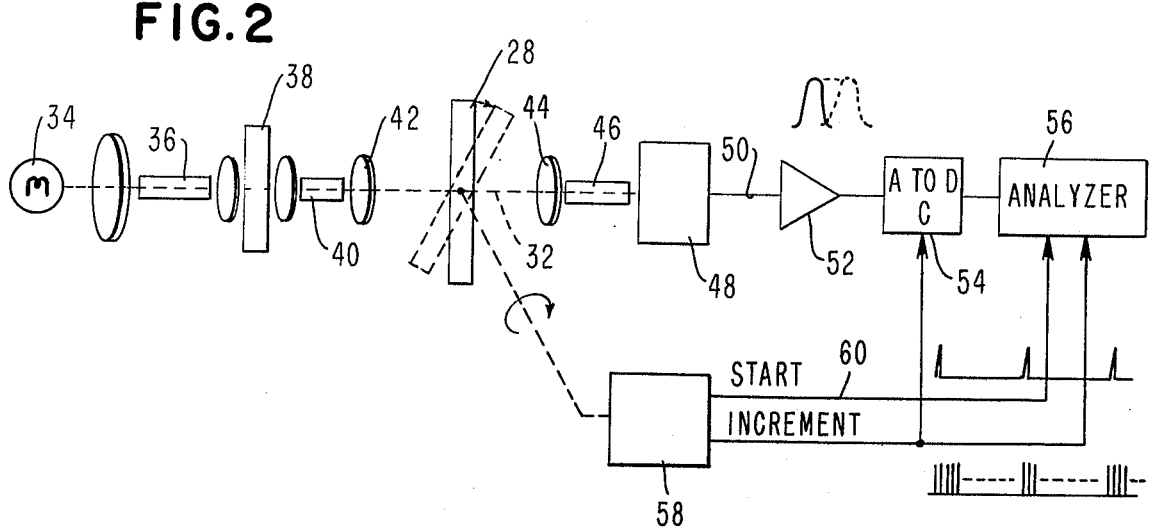
FIG. 2 shows how the filter of FIG. 1 can be rotated to provide the coverage of a band of frequencies.

In accordance with the present invention, the known characteristics of an interference filter to change the wavelength of peak transmission with changes in the angle or incidence of the light is used in a monochromator. As shown in FIGS. 2, 3 and 4 fourteen narrow band interference filters 28 are mounted on a drum 30 tangentially with respect to the periphery of the drum. Each filter is selected for a different wavelength of peak transmission in the visible light range. A light source is fixed to project a radial beam towards the periphery of the drum so that the light entering the filters impinges normally on the filters at one end of the filter and as the drum rotates the angle of incidence of the light on the filter changes from the normal thereby reducing the wavelength of the filtered light. Filter 28a is the filter with the longest wavelength of peak transmission and filter 28b is the filter with the next shortest wavelength of peak transmission and so on. Therefore, as the drum is rotated in a clockwise direction, the monochromatic light transmitted through the filters decreases in wavelength.

The light source 34 is a white light source which is fed into a bundle of fiber optics 36, then columinated, passed through a light transmitting object 38 to be analyzed, focused, and then fed back into a fiber optic bundle 40 the end of which is formed into a slit 25 mils wide. Light from fiber optic bundle 40 is passed through a columinating lens 42 to form a narrow light beam which is passed through the filter 28.

The light beam emerging from the filter is focused by the lens 44, fed through another fiber bundle 46 into a photomultiplying tube 48. The electrical output 50 of this photomultiplying tube is amplified in amplifier 52, converted in an analog to digital converter 54 and fed to a digital analyzer 56. The digital analyzer also receives information from an encoder 58 on two signal lines 60 and 62. The first line 60 provides a pulse each time the light beam 32 passes through the start position at the leading edge 64 of the first filter 28a. The second line 62 provides a pulse each time the drum rotates a selected increment. Therefore the digital analyzer knows which filter 28 the light beam 32 is being transmitted through and the angle at which the light is passing through that filter. The increment signal is also fed to the analog to digital converter so that the analog to digital converter converts at the increment times.

With this arrangement as each filter 28 changes its position through the light beam 32 the wavelength of peak transmission will decrease with increasing change of the light beam angle from the normal. Furthermore as the light beam moves from filter to filter the wavelength of peak transmission will change because of the arrangement of the filters. Therefore the effect is a gradual and smooth increase in the wavelength of the monochromatic light transmitted through the filters as the drum 30 is rotated.

Assuming a theoretical shift of 3% of normal incidence peak wavelength, fourteen filters could be used to cover the entire visible spectrum.

The nominal wavelength of transmission of the first filter 28a would be 700 nm and it would cover the range from 700 to 679 nm. The nominal wavelength of transmission for the second filter would be 679 nm and it would cover the range from 679 to 659 and so on until the entire visible spectrum is covered by the fourteen filters.

Therefore it can be seen that a spectral analysis of the visible light can be made using these fourteen filters by rotating the filters passed the light source one after another to obtain the desired testing frequencies.

While the invention has been particularly shown and described with reference to a preferred embodiment thereof, it will be understood by those skilled in the art that the above and other changes in form and details may be made therein without departing from the spirit and scope of the invention.

What is claimed is:

1. In a monochromator, a combination comprising:
   a light source;
   a series of flat narrow band interference filters, each filter designed for transmitting light at a different nominal wavelength with the whole series of flat narrow band interference filters arranged in a circle in order of decreasing nominal wavelength adjacent the light source for relative rotational movement of the filters and light source so that the light source transmits light radially of the circle, each of said flat filters having one side which is perpendicular to a radius of the circle at one edge of the filter and not perpendicular to a radius of the circle at the opposite edge of the filter so that during said relative rotation movement the light transmitted through each of the filters varies in a range extending substantially from the nominal wavelength when the light is being transmitted through the filter at said one end to some value lower than the nominal wavelength as light is being transmitted through the filters at said other edge;
   light receptor means mounted on the opposite sides of said filters from said light source means for receiving light transmitted through said filters; and,
   means for effecting relative rotation between said filters and said light source means and said receptor means so that light passes through the filters in order of nominal wavelength whereby the nominal wavelength of light passing through each filter changes as the light directed thereon changes its position on the filter and the nominal wavelength of transmission changes substantially continuously across the spectrum covered by the series of narrow band interference filters as the light passes from filter to filter in the series.

2. The monochromator of claim 1 including encoder means for providing electrical pulse information indicating when the light beam passes through a start position for the series of filters and for indicating incremental changes in rotation from said start position.

3. The monochromator of claim 2 including analyzer means for receiving the light outputs from said filters and the electrical pulse information from the encoder means.

4. The monochromator of claim 3 wherein there are sufficient filters to cover the visible light spectrum.

5. The monochromator of claim 2 wherein said analyzer means includes;
   an analog to digital converter which receives analog optical data from said light receptor means and positional data from said encoder means and converts the analog optical data to digital information; and,
   digital analyzer means which receives digital information from the analog to digital converter and positional data from the encoder means.

6. The monochromator of claim 1 wherein the nominal wavelength of each filter is substantially the same as the low level of the range covered by the adjacent filter with the higher nominal wavelength.

* * * * *